United States Patent
Bongartz et al.

(10) Patent No.: US 9,289,863 B2
(45) Date of Patent: Mar. 22, 2016

(54) PARTS WELDED IN A ROTATIONALLY SYMMETRICAL MANNER

(75) Inventors: Robert Bongartz, Neuss (DE); Reiner Dorow, Koblenz (DE); Kurt Müller, Mayen (DE)

(73) Assignee: RUIA GLOBAL FASTENERS AG (DE)

( * ) Notice: Subject to any disclaimer, the term of this patent is extended or adjusted under 35 U.S.C. 154(b) by 211 days.

(21) Appl. No.: 13/497,747

(22) PCT Filed: Sep. 8, 2010

(86) PCT No.: PCT/DE2010/050070
§ 371 (c)(1),
(2), (4) Date: Mar. 22, 2012

(87) PCT Pub. No.: WO2011/035780
PCT Pub. Date: Mar. 31, 2011

(65) Prior Publication Data
US 2012/0177437 A1   Jul. 12, 2012

(30) Foreign Application Priority Data

Sep. 23, 2009  (DE) .......................... 10 2009 042 714

(51) Int. Cl.
| F16C 11/06 | (2006.01) |
| B23P 15/00 | (2006.01) |
| C21D 1/06 | (2006.01) |
| C21D 9/00 | (2006.01) |
| C21D 9/50 | (2006.01) |

(52) U.S. Cl.
CPC . B23P 15/00 (2013.01); C21D 1/06 (2013.01); C21D 9/0068 (2013.01); C21D 9/50 (2013.01); F16C 11/0609 (2013.01); B23P 2700/11 (2013.01); Y10T 403/32631 (2015.01)

(58) Field of Classification Search
CPC . F16C 11/0604; F16C 11/0609; B23K 31/00; B23P 2700/11; B23P 15/00; C21D 1/06; C21D 9/0068; C21D 9/50
USPC ..................... 403/128, 131, 122; 29/898.043, 29/898.052, 898.053
See application file for complete search history.

(56) References Cited

U.S. PATENT DOCUMENTS

| 3,570,090 A * | 3/1971 | Teramachi ............... 29/898.049 |
| 3,965,554 A * | 6/1976 | Amos ...................... 29/898.053 |
| 4,160,543 A | 7/1979 | Dill et al. |
| 4,623,774 A | 11/1986 | Ford |
| 5,070,609 A * | 12/1991 | Teramachi ............... 29/898.049 |
| 5,951,195 A * | 9/1999 | Ruholl .......................... 403/128 |
| 6,098,287 A * | 8/2000 | Takahashi et al. ........ 29/898.043 |
| 6,941,656 B2 * | 9/2005 | Michioka et al. ......... 29/898.049 |
| 2008/0047632 A1 * | 2/2008 | Trojahn et al. ................. 148/222 |

FOREIGN PATENT DOCUMENTS

| DE | 856 256 | 11/1952 |
| DE | 10 2004 053935 | 5/2006 |

(Continued)

*Primary Examiner* — Josh Skroupa
(74) *Attorney, Agent, or Firm* — James R Foley; Clark Hill PLC

(57) ABSTRACT

A part (10) welded in a rotationally symmetrical manner and comprising two parts (12, 14), which are connected by a rotationally symmetrical weld (16), wherein a main loading area (22) occurs in the vicinity of the weld (16), and only the weld (16) and the surroundings (22) thereof are strengthened by case hardening in the extreme fiber in such a way that case strengthening is present there, and a method for producing a part (10) welded in a rotationally symmetrical manner and comprising two parts (12, 14) by welding a rotationally symmetrical weld (16) between the two parts (12, 14), wherein after the parts (12, 14) are welded, the weld (16) and the surroundings (22) thereof are case hardened and the hardened zone (16, 22) is quenched immediately thereafter.

2 Claims, 1 Drawing Sheet

(56) References Cited

FOREIGN PATENT DOCUMENTS

| | | |
|---|---|---|
| EP | 0 082 519 | 6/1983 |
| JP | 55 054524 | 4/1980 |
| JP | 56 130432 | 10/1981 |
| JP | 57-016245 | 1/1982 |
| JP | 7 118 757 | 5/1995 |
| JP | 09-182987 | 7/1997 |
| JP | 2003 120534 | 4/2003 |
| JP | 2006-322513 | 11/2006 |
| JP | 2008-000763 | 1/2008 |

* cited by examiner

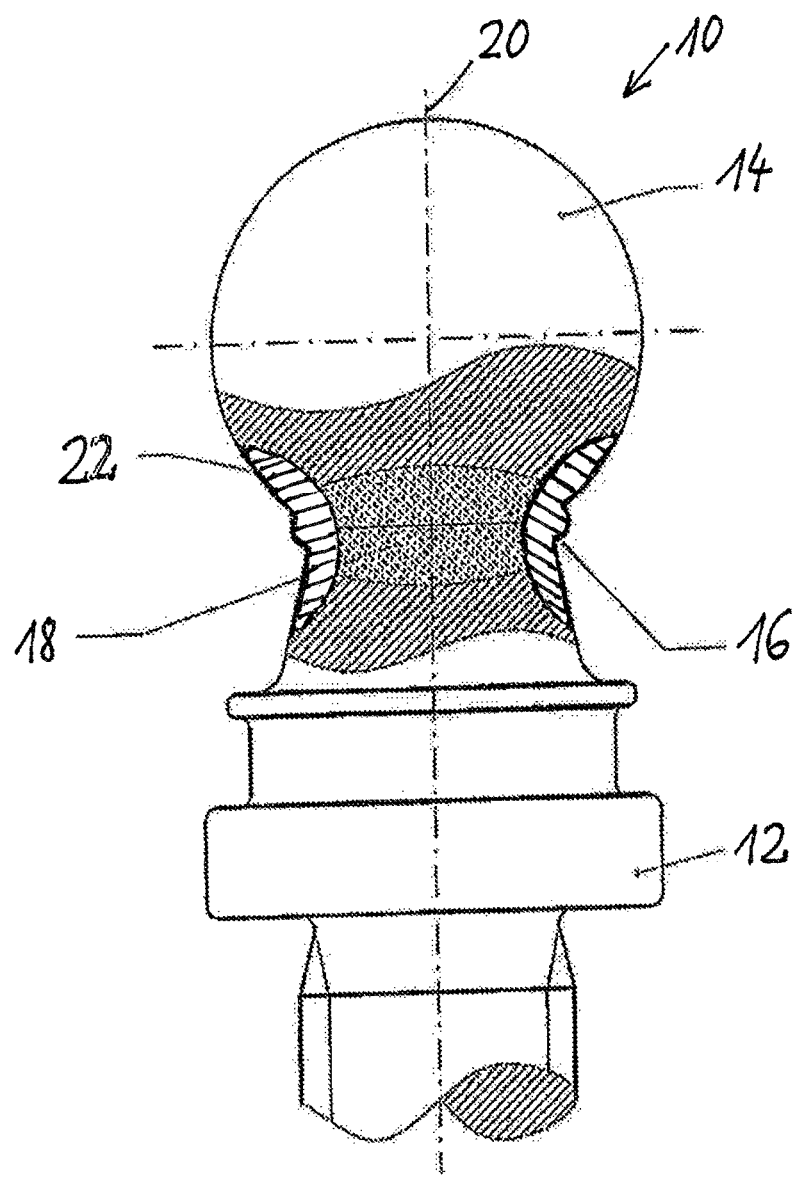

PARTS WELDED IN A ROTATIONALLY SYMMETRICAL MANNER

RELATED/PRIORITY APPLICATION

This application is a National Phase filing regarding International Application No. PCT/DE2010/050070, filed on Sep. 8, 2010, which relies upon German Application No. 10 2009 042 714.7, filed on Sep. 23, 2009, for priority.

TECHNICAL FIELD

The present invention relates to rotationally symmetrically welded parts which are predominantly exposed to continuous alternating bending loads, in particular ball pins comprising a ball and a shaft which are connected by a welded seam. Such ball pins are used for various applications, for example, gas pressure spring buffers or steering systems and require a high stability since such systems are stressed by continuous alternating bending during operation. In this case, the transition between ball and shaft is in particular exposed to extremely high loading. Accordingly, ball pins must be dimensioned so that they withstand these loads.

PRIOR ART

In the prior art it was only known hitherto either to turn such rotationally symmetrical parts in one piece, which is extremely expensive to manufacture or to simply weld the parts. A corresponding welding of ball and shaft to form a ball pin as a rotationally symmetrical part is known, for example, from DE 856 256. In the latter case, fractures frequently occurred between shaft and ball.

It is further known from the prior art to subject components as a whole to a hardening and/or an edge layer hardening, such as is presented, for example, in DE 10 2004 053 935 A1.

DESCRIPTION OF THE INVENTION

Starting from this prior art, it is therefore the object of the present invention to further develop such a rotationally symmetrical welded part in such a manner that it has an appreciably higher strength, in particular a substantially higher flexural fatigue strength, and therefore a correspondingly higher lifetime, and to provide a method for producing such a part.

The present invention proposes for solving this object for the first time merely to subject the welded seam of the rotationally symmetrical welded part and optionally its surroundings to an edge layer hardening although this has encountered prejudice in the prior art in that the edge layer hardening of a welded seam is always counterproductive since this causes an embrittlement of the edge layer of the welded seam which makes the welded seam brittle under tensile loading.

In many cases of application, as here in a ball pin, no tensile loading takes place at all but the lifetime of the part is limited by its flexural fatigue strength.

Experiments of the patent applicant have revealed that as a result of the procedure according to the invention, the flexural fatigue strength of ball pins, for example, can be increased by about a decade, i.e. by a factor of 10 although in the view of the experts, edge layer hardening of a welded seam is rather disadvantageous on account of the resulting embrittlement.

According to the invention, this object is solved in a generic rotationally symmetrically welded part whereby the principal loading region in the edge fibre is strengthened by strengthening the welded seam and its surroundings by edge layer hardening in the edge fibre in such a manner that an edge layer strengthening by intrinsic compressive stresses is provided there.

In this case, it is particularly preferred to produce the edge layer strengthening by edge layer hardening directly followed by quenching of the hardened zone.

The present invention is particularly suitable for producing ball pins consisting of a ball and a shaft which are connected by a rotationally symmetrical welded seam. Such ball pins are not usually subjected to any tensile loadings in which edge layer hardening could be disadvantageous but their lifetime is exclusively limited by the flexural fatigue strength. Furthermore, the method of manufacture according to the invention with edge layer hardening restricted to the welded seam and its immediate surroundings makes it possible to preserve the gloss level of the ball.

A rotationally symmetrical part according to the invention can be manufactured, for example, by inductive hardening, laser hardening or plasma ion hardening.

A method for producing such a rotationally symmetrically welded part is also provided according to the invention in which after welding the individual parts an edge layer hardening of the welded seam and its surroundings directly followed by quenching of the hardened zone is accomplished.

BRIEF DESCRIPTION OF THE DRAWINGS

The present invention is explained in detail hereinafter with reference to the exemplary embodiment shown in the drawing in the form of a ball pin:

In the figures:

FIG. 1 shows a ball pin according to the invention from the side, in a partially cutaway view.

BEST MODE FOR IMPLEMENTING THE INVENTION

FIG. 1 shows a ball pin 10 according to the invention, comprising a shaft or pin 12 and a ball 14. The ball pin 10 is shown from the side and the transition region between shaft 12 and ball 14 of particular interest here is shown in cutaway view.

The ball pin 10 according to the invention shown here is produced by welding ball 14 and shaft 12. The corresponding welded seam 16 can be seen at the edge in the sectional view. It runs rotationally symmetrically about the axis of rotation 20 of the shaft 12.

The welding of ball and shaft produces a heat influx zone 18 around the welded seam 16, which is characterised by the interrupted shading in the sectional view and when viewed three-dimensionally is formed approximately as a lens shape rotationally symmetrically to the axis of rotation 20 of the shaft 12. As can be seen in the drawing, this has a symmetrical elliptic shape in cross-section.

According to the invention, the regions 22 shown blank in the sectional view are particularly hardened so that the ball pin according to the invention has optimised hardening zones here.

According to the invention, by means of a special sequence of process steps, after the welding process the principal loading region of the welding zone 22 is hardened in the edge fibre so that edge layering strengthening of the welded seam 16 and its surroundings comes about. As a result, an appreciable increase in the lifetime of the ball pin is achieved according to the invention, even when this is subjected to very severe vibrational stress.

The particularly preferred procedure according to the invention for producing this strengthening in the principal loading region of the welding zone 22 takes place as follows:

The ball 14 is welded onto the pin 12. A rotationally symmetrical welded seam 16 is produced. An edge layer hardening of the welding zone 22 is then carried out immediately followed by quenching of the hardened zone 22. The hardening can be accomplished, for example, by inductive hardening, laser hardening or plasma ion hardening.

In this way, the strength of the welding zone 22 which is particularly sensitive to notch stresses and crack formation is appreciably improved. The lifetime of the complete component is thus substantially improved.

The invention claimed is:

1. A ball pin comprising a ball and a shaft which are connected by a rotationally symmetrical welded seam, wherein the welded seam is in a heat influx zone having a lens shape rotationally symmetrical to an axis of rotation of the shaft, said heat influx zone comprising the welded seam, a portion of the ball and a portion of the shaft, wherein an edge layer of the heat influx zone is hardened relative to that of remaining portions of the ball and shaft which are outside the zone.

2. A method for producing a ball pin comprising a ball and a shaft, said method comprising: welding a rotationally symmetrical welded seam between the ball and the shaft, providing a heat influx zone having a lens shape rotationally symmetrical to an axis of rotation of the shaft; after welding the ball and the shaft; hardening an edge layer of the heat influx zone by at least one of inductive hardening, laser hardening, and plasma ion hardening; and quenching the edge layer of the heat influx zone.

\* \* \* \* \*